United States Patent [19]

Max

[11] Patent Number: 4,537,081
[45] Date of Patent: Aug. 27, 1985

[54] FLOW METERING CIRCUIT AND METHOD

[76] Inventor: John K. Max, 1420 Healdsburg Ave., Healdsburg, Calif. 95448

[21] Appl. No.: 562,484

[22] Filed: Dec. 15, 1983

[51] Int. Cl.³ .............................................. G01F 15/00
[52] U.S. Cl. ................................. 73/861.77; 324/166
[58] Field of Search ............... 73/861.77, 861.78, 195; 324/165, 166

[56] References Cited

U.S. PATENT DOCUMENTS

| | | | |
|---|---|---|---|
| 3,605,729 | 9/1971 | Liu et al. | 73/861.77 X |
| 3,728,565 | 4/1973 | O'Callaghan | 324/165 X |
| 3,922,525 | 11/1975 | Kozak et al. | 73/861.77 X |
| 4,450,403 | 5/1984 | Dreisetl et al. | 324/165 X |

Primary Examiner—Herbert Goldstein
Attorney, Agent, or Firm—Townsend & Townsend

[57] ABSTRACT

A circuit arrangement and method for use with a flow metering device for reliably converting a multiphase flow signal including a plurality of input phase signals into a multiphase output signal accurately representing the amount and direction of fluid flow. From each of the input phase signals is derived a sequence of instantaneous graduated reference levels. Each of the input phase signals is compared with an associated sequence of reference levels. A first pulse train is provided when an input phase signal crosses its associated reference level in an ascending direction and a second pulse train is provided when the reference levels are crossed in a descending direction. The amount and direction of fluid flow is then determined from the combined pulse trains generated by the level crossings of each of the input phase signals.

9 Claims, 5 Drawing Figures

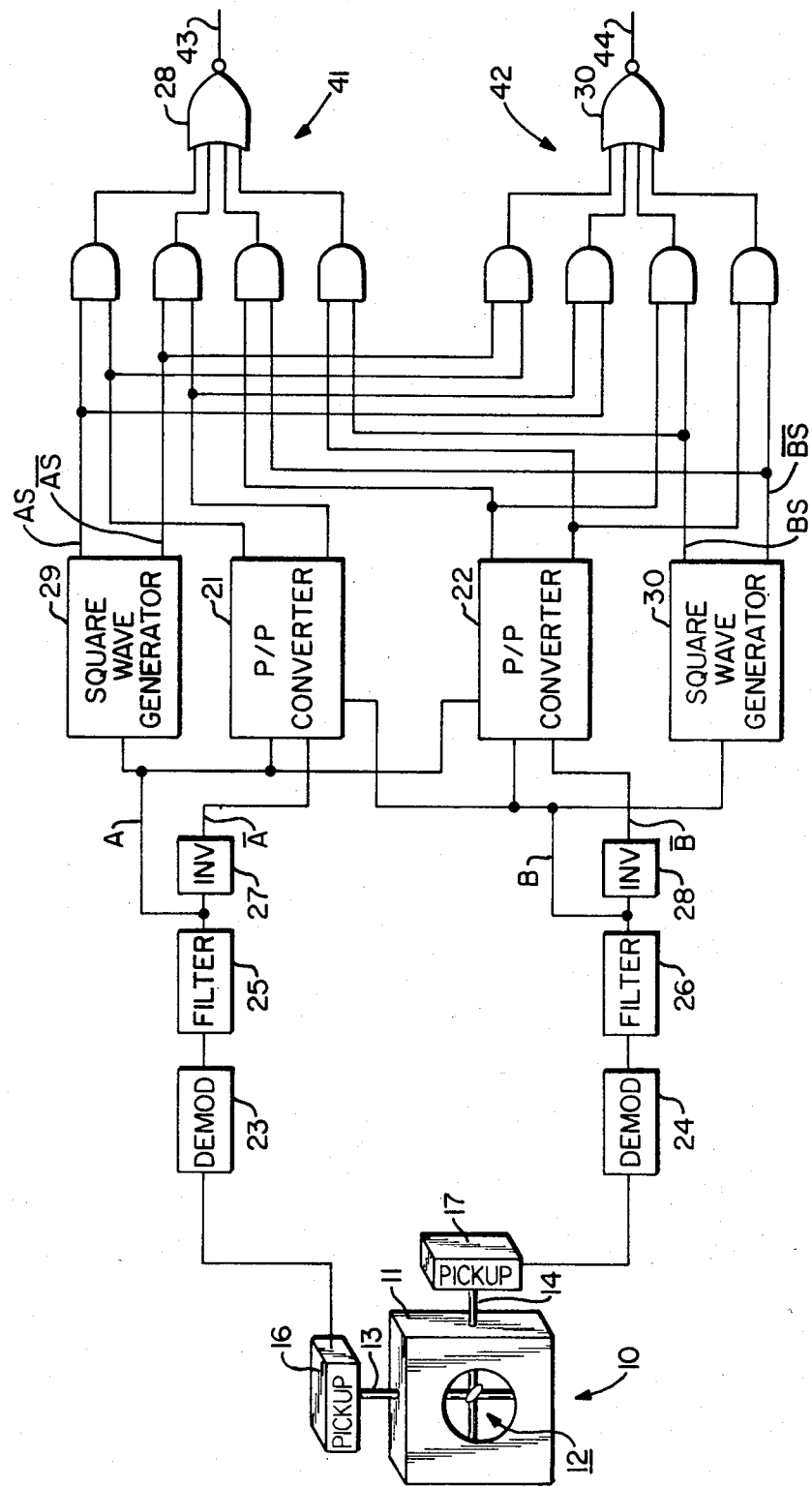
FIG._1.

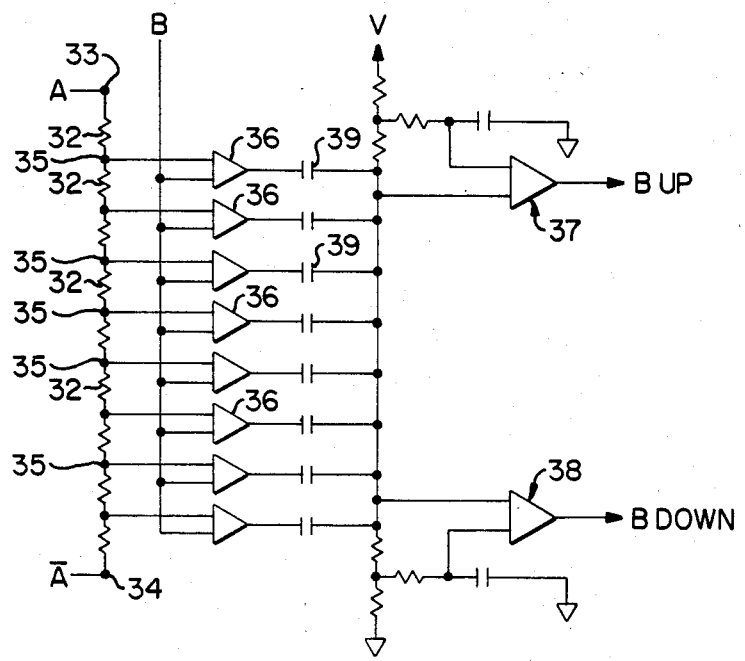
FIG._2.
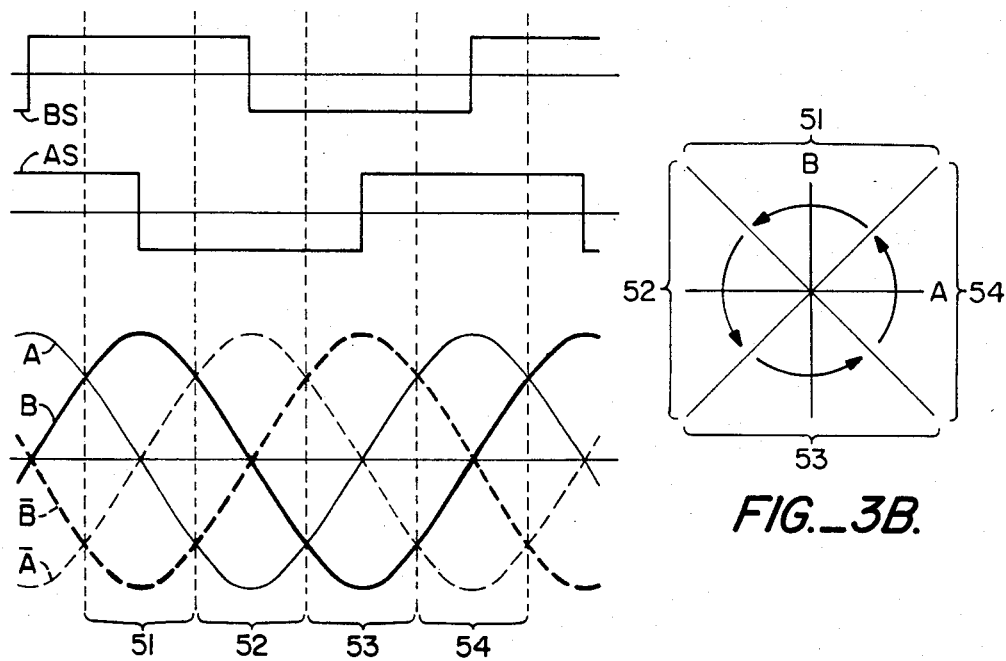
FIG._3A.
FIG._3B.

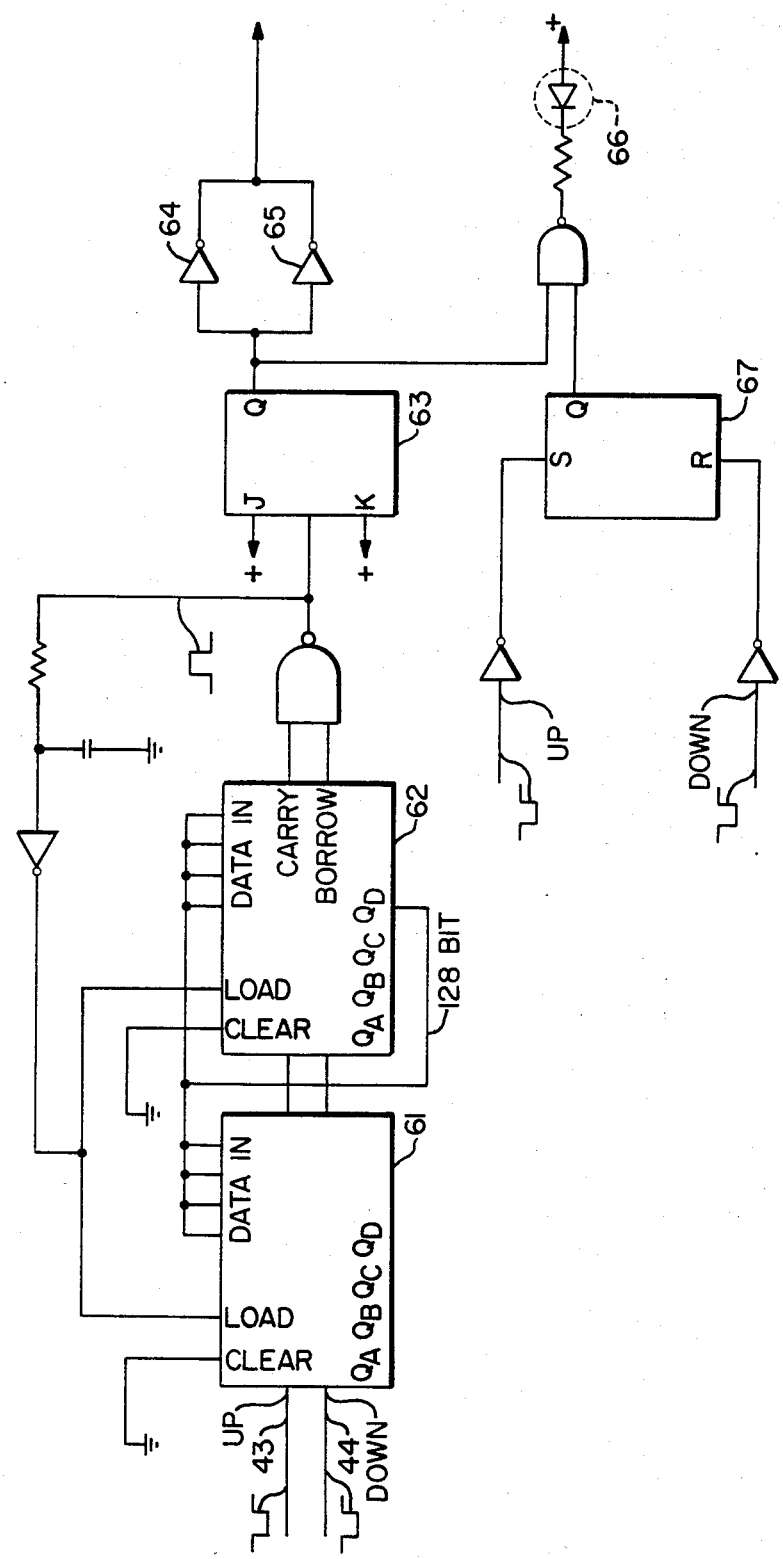
FIG._4.

FLOW METERING CIRCUIT AND METHOD

BACKGROUND OF THE INVENTION

The invention relates generally to devices for metering the rate and direction of fluid flow and is more particularly directed to a technique for electronically processing and analyzing multiphase signals provided by a fluid flow sensing or sampling device.

Numerous devices are known for monitoring and measuring the flow of fluids through conduits of various kinds. Such fluid metering devices typically comprise a mechanical sensor or probe which is introduced into, or otherwise operatively associated with, the fluid to be metered. By means of a transducer, a physical quantity sensed by the sensor or sampled by the probe is converted into one or more raw electrical signals representative of the fluid flow.

Some flow sensing devices, for example, turbine flow meters, include a pair of pickups which generate a two-phase signal comprising a pair of sine waves 90° out of phase with one another. These devices derive fluid flow information from the zero crossings of the sine waves. As there are only four zero crossings per cycle, however, the resolution of these devices is limited.

SUMMARY OF THE INVENTION

The present invention provides a simple electronic means for use with a flow metering device for reliably converting a multiphase flow signal into a multipulse output signal accurately representing the amount and direction of fluid flow. The invention provides a plurality of cycles of the multipulse output signal per cycle of the raw multiphase input signal so as to achieve a resolution significantly greater than that obtainable by the zero crossing method. The electronic circuit according to the invention provides good stability with respect to temperature, supply voltage variations, and manufacturing variations in mechanical and electronic components so as to achieve a reliable and cost-effective flow metering device.

Briefly, a circuit arrangement according to the invention operates according to the following method. From each of the input phase signals of the raw multiphase signal is derived a reference sequence of instantaneous graduated reference levels. Each of these reference sequences is associated with one of the input phase signals, other than the signal from which it was derived. Such association between input phase signals and reference sequences is referred to herein as cross-association. The invention then calls for determining when each input phase signal crosses the multiple levels of its cross-associated reference sequence. A signal, referred to herein as a reference-crossed signal, is provided for each of the input phase signals to indicate both the moment and the direction at which the reference levels are crossed. The amount and direction of the fluid flow is then determined from the combined outputs of each input phase signal's reference-crossed signal.

The above method is practiced by a circuit arrangement included in the flow metering device. The circuit arrangement includes reference-sequence means which is responsive to each of the electrical signals conjointly representing the fluid flow. The reference-sequence means may include, for example, a plurality of voltage dividers. Each input phase signal (after demodulation and filtering if necessary) is applied to an associated voltage divider. The voltage dividers serve to define the graduated sequences of reference levels. The circuit arrangement includes a plurality of assemblies of comparators, each assembly being responsive to one of the input phase signals and to the reference levels defined by the cross-associated reference sequence.

Means are connected to the comparator outputs which separate the outputs into positive-going or negative-going comparisons. The moment of the comparisons then trigger one of two pulse generators. The output pulse train of one pulse generator represents ascending values of the input phase signal with respect to its cross-associated reference levels. The output pulse train of the other pulse generator represents descending comparisons. Logic means receiving the pulse generator pulse trains may provide one or more flow signals. A first flow signal from the logic means indicates the rate of fluid flow in a first direction, and a second flow signal indicates the rate of fluid flow in the opposite direction. The signals may, of course, be combined to provide a single signal continuously indicating fluid flow when the flow direction is not of interest.

An advantage of the present invention lies in the cross-association of electrical signals with the reference sequences. The cross-association is especially effective in compensating for variations in the average amplitude of the input phase signals. Typically these signals are produced by electromagnetic devices such as linear differential transformers or photo-optical devices, which show input and output voltage sensitivities, as well as temperature-related effects. The cross association of one signal as a reference for another reduces the effect which temperature and other common variables have on the accuracy and stability of the circuit operation.

Another advantage of the invention lies in the capability of controlling the number of intermediate reference levels defining each reference sequence. The reference levels act as discrete sampling points for sampling the representative input phase signals. With a larger plurality of reference levels a determination with better resolution of fluid flow is made.

Another advantage of the invention is the accuracy with which changes in the direction of the flow can be monitored. A change in flow direction occurring within a fraction of the fundamental period of the input phase signals may be detected by defining a sufficient number of reference levels to provide the desired resolution.

A fuller understanding and appreciation of the nature and advantages of the invention may be gained by reference to the remaining portion of the specification and the attached drawings.

BRIEF DESCRIPTION OF THE DRAWINGS

FIG. 1 is a block schematic diagram of flow metering apparatus according to the invention;

FIG. 2 is a schematic diagram showing a position-to-pulse converter for use in the embodiment of FIG. 1;

FIG. 3A is a graph of two oscillatory signals illustrating the manner in which the invention tracks variations in the fluid flow rate and direction;

FIG. 3B is a graphical representation of the equivalent rotation represented by the oscillatory signals of FIG. 3A; and FIG. 4 is a block schematic diagram of an anti-dither circuit for use with the embodiment of FIG. 1.

DETAILED DESCRIPTION OF THE PREFERRED EMBODIMENT

FIG. 1 shows an overall view of a metering device according to the invention. The device includes a means 10 for sampling or probing the fluid flow. The sampling means illustrated in FIG. 1 includes a body 11 having an orifice 12, through which the fluid flows. A pair of mutually orthogonal reciprocating arms 13 and 14 extend into the orifice 12 and are coupled together so as to undergo coupled reciprocating motion which defines an equivalent rotation, the direction of which is determined by the direction of flow. The amount of reciprocating motion of the arms 13 and 14 and their relative phase provides a measure of the amount and direction of fluid flow.

Flow sampling means 10 includes a pair of electrical pickups 16 and 17 operatively associated with the arms 13 and 14, respectively. The pickups 16 and 17 provide raw electrical signals which conjointly represent the flow through orifice 12. The particular embodiment of fluid flow sampling means 10 and pickups 16 and 17 is not part of the present invention and is shown in FIG. 1 for purposes of illustration only. The present invention provides a method and a circuit arrangement for analyzing the electrical signals provided by pickups 16 and 17 so as to provide an accurate determination of both the flow and direction of flow. A detailed exposition of fluid flow sampling means 10 suitable for use with the present invention is given in my copending patent application Ser. No. 562,483 entitled "Positive Displacement Piston Flowmeter" filed Dec. 15, 1983.

According to the invention a sequence of graduated reference levels, for example, a plurality of monotonically decreasing or increasing voltage levels, is derived from each of the raw electrical signals provided by pickups 16 and 17. The reference sequence derived from the signal from pickup 16 is used to sample the electrical signal provided by pickup 17, and vice versa. The association of an electrical signal from one of the pickups 16 or 17 with the reference sequence derived from the other signal is referred to herein as a cross-association of signals and reference sequences.

In the embodiment of FIG. 1 the reference sequences are defined by position-to-pulse (P/P) converters 21 and 22. The converters 21 and 22 are connected to the outputs of pickups 16 and 17 (which in FIG. 1 may be provided by linear differential transformers) through demodulation circuits 23 and 24 and filter circuits 25 and 26, respectively. The design of suitable demodulation and filter circuits depends on the particular pickup used as will be apparent to those skilled in the art. The signal provided by pickups 16 and 17 may include undesirable noise components or a carrier signal unrelated to the reciprocating motion of the arms 13 and 14 and may also provide a nonlinear representation of the reciprocating motion of the respective arms. The demodulation circuits provide oscillatory signals of an approximately sinusoidal nature having a frequency related to the flow rate and a plus or minus 90° phase shift relation determined by flow direction. The filtered oscillatory signals A and B are provided at the outputs of filter circuits 25 and 26, respectively. Inverted oscillatory signals designated $\overline{A}$ and $\overline{B}$ are provided by inverting amplifiers 27 and 28. The oscillatory signals A, B and $\overline{A}$, $\overline{B}$ are applied directly to the P/P converters 21 and 22, which derive therefrom the respective reference sequences and provide pulse trains indicating the relative positions of the respective arms 13 and 14.

Also included in the embodiment of FIG. 1 are square wave generators 29 and 30 receiving the oscillatory signals A and B, respectively, and providing square waves designated AS and BS, respectively, having a period the same as the oscillatory signals A and B. Square wave generators 29 and 30 also provide inverted square waves, designated $\overline{AS}$ and $\overline{BS}$. The positive and negative portions of the square waves provide a digital representation of the positive and negative portions of oscillatory signals A and B.

A preferred form of P/P converter 21 will be described with reference to FIG. 2. The means defining the reference sequence is provided by a voltage divider consisting of series resistors 32 with intermediate taps 35. Oscillatory signal A is applied to node 33 at one end of the series of voltage dividing resistors 32 while the inverted signal $\overline{A}$ is applied to node 34 at the other end. The values of resistors 32 are selected so as to provide equal spacing with respect to fluid flow of the reference levels over a phase change of 90° in the oscillatory signal B. Connected to the voltage divider at taps 35 is an assembly of comparators 36. Each comparator of the assembly has a first comparison input connected to a corresponding tap 35. A second comparison input of each comparator 36 is connected to receive the cross-associated oscillatory signal B. In this manner the phase and amplitude of signal A are used to define a sequence of reference threshold levels for the assembly of comparators 36. As the signal B varies, these reference thresholds will be crossed in an ascending or descending direction.

The outputs of comparators 36 are connected to amplifiers 37 and 38. These amplifiers provide a means of "OR"ing the up transitions of comparators 36 to amplifier 37 and the down transitions of comparators 36 to amplifier 38. Amplifier 37 provides a pulse train designated "BUP" which corresponds to up crossings of signal B at comparators 36. A pulse train designated "BDOWN" provides pulses corresponding to down crossings of comparators 36.

The "OR"ing means between comparators 36 and amplifiers 37 and 38 shown in FIG. 2 operate as follows. As the signal B crosses the reference threshold level of each of the comparators 36, the comparator output signals will change from a logic 1 to a logic 0 or vice versa, depending upon the direction of variation of the signal B. A positive or negative voltage spike will be transmitted across the respective capacitor 39 with each level crossing. The polarity of the spike is determined by the direction of the crossing. Amplifiers 37 and 38 serve a pulse discriminating and shaping function and provide the pulse trains BUP and BDOWN, respectively.

The signals from P/P converter 21, "BUP" and "BDOWN", are combined with the signals AS and $\overline{AS}$ by logic means 41, which is provided in FIG. 1 by an AND/NOR combination. A pulse train appears at output 43 from logic means 41 when fluid flows in one direction. The pulse train then switches to output 44 from logic means 42 when the direction of fluid flow is reversed (the output of P/P converter 22 and sequence wave generator 30, "AUP", "ADOWN" BS, $\overline{BS}$ are fed to logic means 42).

The manner in which the means 41 and 42 determine the direction and rate of fluid flow will be described with reference to FIG. 3A. In the region designated 51 a pulse train ADOWN is provided by P/P converter 22. When the reference sequence is defined by the circuit of FIG. 2, this pulse train will include eight pulses in the region 51. Also in this region the signal B is positive, as indicated by the positive value of square wave BS. In the neighboring region 52 a pulse train BDOWN is provided by P/P converter 21 while square wave AS indicates that the signal A is negative. The neighboring regions 53 and 54 may be analyzed similarly. The disposition of signals A and B just described corresponds to an equivalent rotation in the counterclockwise direction as indicated in FIG. 3B. Equivalent rotation in the clockwise direction will produce an analogous sequence of dispositions of the signals AUP, ADOWN, BUP, BDOWN, and the associated square waves. The equivalent rotation defined by these signals corresponds to the equivalent rotation defined by arms 13 and 14 (which could also be an equivalent rotor position of a rotating device), which is related to the direction of fluid flow. The rate at which the signals A and B traverse the cross-associated reference sequences, i.e., the pulse repetition rates, is related directly to the rate of fluid flow through orifice 12. As will be readily appreciated by those skilled in the art, the logic gate array illustrated at 41 and 42 in FIG. 1 provides output pulse trains at 43 and 44 representing flow in one or the other direction. The accuracy with which the flow is represented by these pulse trains, and the resolution with which the circuit arrangement can track flow fluctuations, depends on the number of reference levels in the reference sequences and upon the spacing of levels set by resistors 32 in FIG. 2, hence the number of pulses provided at outputs 43 and 44 and their uniformity with respect to flow.

For a fluid flow in one direction a pulse train is provided at either output 43 or 44 having 32 pulses per equivalent revolution of the arms 13 and 14. Due to such external influences as mechanical vibration and fluctuations in the direction of fluid motion, an occasional counter-flow signal may be observed at the other output 44 or 43. FIG. 4 shows an anti-dither circuit for eliminating such unwanted counter-flow signals. As seen in FIG. 4, a pair of 16 bit presetable Up/Down counters 61 and 62 are connected to receive the pulse trains 43 and 44. The counters may be provided for example by National integrated circuit part number 74C193.

Counters 61 and 62 are cascaded to form a 256− bit UP/DOWN counter receiving the up flow and down flow outputs 43 and 44. If the net flow is in the up direction, the 256− bit counter will count up to 128, at which point the 128 bit will go high (at the $Q_D$ output of counter 62). The 128 bit is fed back to the LOAD DATA inputs of counters 61 and 62. Up pulses will continue to increment the cascaded counters 61 and 62 up to 255, at which point the next pulse will generate a carry pulse. The carry pulse is used to set the cascaded counters 61 and 62 back to 255 and is also used to toggle flip flop 63.

If the flow continues in the up direction a square wave is output by buffers 64 and 65. If the flow momentarily reverses direction and down pulses are fed into counter 61, the cascaded counters count down from 255 and then must count back up to 255 before a net output is generated.

The circuit operates analogously in the predominantly reverse flow mode except that the counter must count to zero before a BORROW signal is created and the 128 bit output loads a zero instead of a 256 bit. The circuit can accommodate plus or minus 256 bits of dither.

An additional LED 66 is provided to visually indicate the net forward flow direction. LED 66 is driven by the on cycle of flip flop 63 which is NANDed together with a "last up" pulse into RS flip flop 67. The LED provides a useful visual aid in installation and maintenance of the flowmeter.

While the above provides a full and complete disclosure of the preferred embodiments of the present invention, various modifications, alternate constructions, and equivalents will occur to those skilled in the art given the benefit of this disclosure. For example, the particular embodiment illustrated in FIG. 1 shows a fluid sampling means providing only two electrical signals having a relative phase representing the flow direction. Those skilled in the art will readily be able to apply the teachings of this example to sampling means providing a larger plurality of electrical signals with a more complicated phase relationship. In addition, many of the logical functions provided by the means illustrated in FIG. 1 can also be performed by an appropriately programmed microprocessor. Given the teachings of this disclosure, those skilled in the art of microprogramming will readily be able to generate such an implementation of the invention.

Such modifications and alternate constructions are considered to fall within the spirit and scope of the invention disclosed herein, which is defined by the appended claims.

What is claimed is:

1. A circuit arrangement for use in a fluid metering device for providing an output signal accurately representing a fluid flow, said metering device sampling the fluid flow and providing a multiphase flow signal including a plurality of input phase signals conjointly representing the fluid flow, wherein said circuit arrangement comprises:
    reference-sequence means responsive to each said input phase signal for deriving therefrom a reference sequence of instantaneous graduated reference levels;
    comparison means responsive to each said input phase signal for comparing each said signal to a cross-associated reference sequence;
    reference-crossed means connected to said comparison means for providing a reference-crossed signal associated with each said input phase signal, each said reference-crossed signal indicating the moment and direction said input phase signal crosses the levels of the cross-associated reference sequence; and
    logic means responsive to said reference-crossed signals for providing an output signal indicating the amount and direction of said fluid flow.

2. The apparatus of claim 1, wherein said reference-sequence means includes means for deriving an oscillatory signal from each said input phase signal, said reference sequences being derived from said oscillatory signals.

3. The apparatus of claim 2, wherein said reference-crossed means includes means providing a pair of pulse trains, a first pulse train corresponding to ascending level crossings and a second pulse train corresponding to descending level crossings.

4. A circuit arrangement for use in a fluid metering device for providing an output signal accurately representing a fluid flow, said metering device sampling the fluid flow and providing first and second input phase signals conjointly representing said flow, wherein said circuit arrangement comprises:

first and second reference-sequence means responsive to said first and second input phase signals, respectively, for deriving therefrom first and second reference sequences of instantaneous graduated reference levels;

first and second assemblies of comparators responsive to said first and second input phase signals and to the reference levels of said first and second sequences, respectively, for determining when each reference level is crossed;

first and second pulse train means connected to said first and second assemblies of comparators, respectively, each said pulse train means generating a pair of pulse trains, a first pulse train of each pair indicating the rate at which the respective reference levels are ascendingly crossed and a second pulse train of each pair indicating the rate at which the respective reference levels are descendingly crossed;

flow-signal means responsive to said pulse trains for providing a pair of flow signals, a first flow signal indicating the rate of flow in a first direction and a second flow signal indicating the rate of flow in the opposite direction.

5. The apparatus of claim 4, further comprising:
first and second demodulation means for deriving first and second oscillatory signals from said first and second input phase signals, respectively, said oscillatory signals having a frequency related to the fluid flow rate and a relative phase related to the fluid flow direction;

said reference-sequence means deriving said reference sequences from said oscillatory signals and said assemblies of comparators comparing respective oscillatory signals with said reference levels.

6. The apparatus of claim 4 wherein said flow-signal means comprises a logic gate array receiving said pulse trains.

7. A method of accurately monitoring the flow of a fluid to track both the amount and direction of flow, said method being used with a flow metering device which samples the fluid flow and provides a multiphase signal including a plurality of input phase signals conjointly representing the flow, said method comprising the steps of:

deriving from each said input phase signal a reference sequence of instantaneous graduated reference levels;

cross-associating with each said input phase signal one of said reference sequences;

determining when each said input phase signal crosses the levels of its cross-associated reference sequence and providing a reference-crossed signal for each said cross-associated reference sequence indicating the direction of the level crossings; and determining from said reference-crossed signals the amount and direction of said fluid flow.

8. The method of claim 7, wherein each said reference-crossed signal comprises a pulse train having pulses spaced to correspond to said level crossings.

9. The method of claim 7, wherein each said reference-crossed signal comprises first and second pulse trains having pulses spaced to correspond to said level crossings, said first pulse train corresponding to ascending level crossings and said second pulse train corresponding to descending level crossings.

* * * * *